Aug. 9, 1927.
M. W. McCONKEY ET AL
1,638,354
MOTOR VEHICLE
Filed March 7. 1924
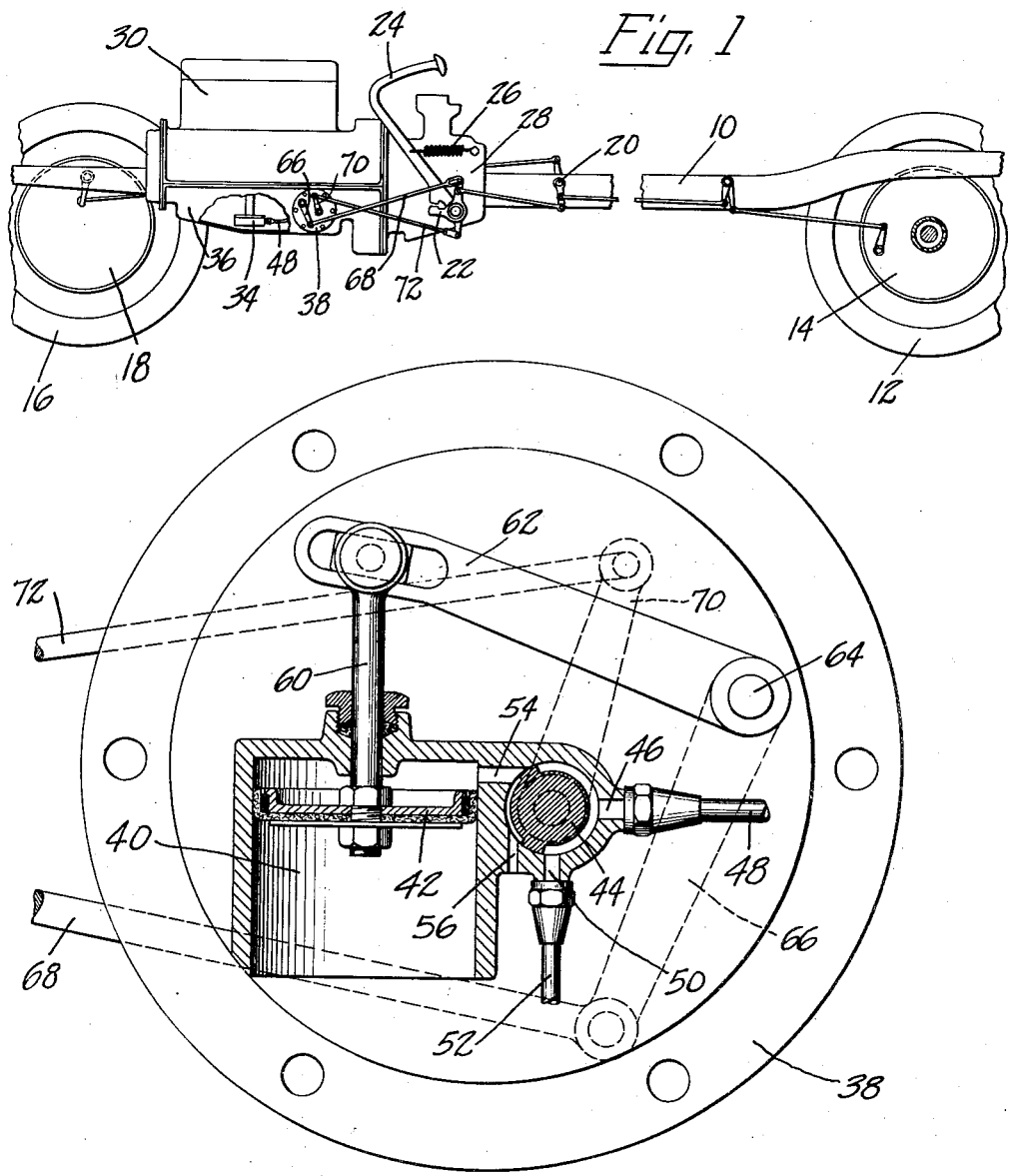
Inventors
Montgomery W. McConkey
and Fred E. Jones
By their Attorneys Patented Aug. 9, 1927.

1,638,354

UNITED STATES PATENT OFFICE.

MONTGOMERY W. McCONKEY, OF FERNDALE, AND FRED E. JONES, OF DETROIT, MICHIGAN, ASSIGNORS TO GENERAL MOTORS CORPORATION, OF DETROIT, MICHIGAN, A CORPORATION OF DELAWARE.

MOTOR VEHICLE.

Application filed March 7, 1924. Serial No. 697,613.

This invention relates to motor vehicles, and is illustrated as embodied in a motor vehicle having brakes applied under the control of the driver by power derived from the oil-circulating pump.

An object of the invention is to provide inexpensive and efficient means for supplying power to assist the driver in applying the brakes or equivalent devices, by utilizing, to supply the power, the pump already embodied in the engine as a part of one of its fluid-circulating systems. Preferably the oil pump is used for this purpose, a driver-controlled valve being provided in one desirable arrangement which is arranged to be moved to a position where it restricts or shuts off the flow of oil from the pump to the oiling system, forcing the oil to "back up" under a substantial pressure to a power cylinder and piston. It is highly desirable that the valve-controlling member, shown as the service brake pedal, should be arranged to apply the brakes manually if the engine is not running, or if the power is insufficient.

The above and other objects and features of the invention, including various novel combinations and desirable particular constructions, will be apparent from the following description of one illustrative embodiment shown in the accompanying drawings, in which:

Figure 1 is a diagrammatic longitudinal vertical section through an automobile chassis having a novel detachable power-cylinder unit carried by the crankcase and arranged to supply power for applying the brakes; and Figure 2 is a view, partly in side elevation and partly in vertical section, of the power-cylinder unit detached from the engine, and turned around from its position in Figure 1.

In the arrangement selected for illustration, the invention is embodied in an automobile chassis having a frame 10, rear wheels 12 having brakes 14, and front dirigible wheels 16 which may, if desired, be provided with brakes 18. The brakes are all linked to a rockshaft 20 operated by a bellcrank lever 22 engaged by a projection on a service brake pedal 24, to operate the brakes manually against the resistance of a return spring 26, the pedal and bellcrank lever being mounted on the transmission and clutch housing 28.

The rear wheels are driven in the usual manner by an internal combustion engine 30 having various fluid-circulating systems including an oiling system with an engine-driven oil-circulating pump 34 which may be geared to the camshaft in the usual manner. Oil for this system is supplied to the pump from a reservoir in the crankcase 36.

According to an important feature of this invention, power from pump 34 is availed of to assist the driver in applying the brakes. To this end, crankcase 36 is provided with an opening, through which is introduced a unit comprising a cover 38 for the opening and a power cylinder 40 and piston 42 carried by the cover. The casting of cylinder 40 is provided with a cylindrical bore for a rotary valve 44 interposed between a passage 46 communicating with a conduit 48 from pump 34, and a passage 50 leading to the oiling system 52 on the one hand and a passage 54 leading to cylinder 40 on the other hand. The cylinder casting is also provided with an exhaust passage 56 leading back into the crankcase.

It will be seen that with the valve 44 in the position shown in Figure 2, passages 46 and 50 are in communication with each other, thus allowing normal circulation of oil through the oiling system, and that cylinder 40 and its passage 54 are in communication with the exhaust passage 56, thus relieving all pressure on piston 42. However, except for leakage past the piston, that part of the cylinder above the piston is full of oil. When the valve is turned in a counter-clockwise direction (Figure 2), it first restricts and then shuts off the connection between passages 46 and 50, at the same time first shutting off passage 56 and then establishing communication between passages 46 and 54, thus causing the oil from the pump to "back up" under pressure into cylinder 40. As this cylinder is already full of oil, almost immediately pressure is applied to piston 42.

Piston 42 operates through a connecting rod 60 to rock a lever 62 secured to a rockshaft 64 extending to the outside of the crankcase and there provided with an arm 66 connected by a link 68 to the bellcrank lever 22 which applies the brakes. Valve 44 is operated by a shaft in axial alinement therewith and extending to the outside of the crankcase, where it is provided with an arm 70 connected by a link 72 to the lower end of pedal 24.

It will be seen that in operation depression of pedal 24 rocks the valve 44 to cause power operation of bellcrank lever 22, while it also rocks this lever directly by manual power if the engine is not running or if the power from the oil pump is insufficient. In the arrangement illustrated, the cylinder and piston are of such size that the power therefrom merely overcomes the return springs of the brakes and their connections, and causes a light braking pressure, leaving the driver to supply the remainder of the braking pressure himself so that he will get the "feel" of the brakes.

While one illustrative embodiment of the invention has been described in detail, it is not the intention to limit its scope to that embodiment or otherwise than by the terms of the appended claims.

We claim:

1. In brake applying mechanism for motor driven vehicles and in combination with an engine for driving the vehicle, and a pump which is constantly driven by the engine and acts to force oil from the crank case thereof to various parts of the engine to be lubricated; a cylinder; a piston operating within said cylinder and which piston is operatively connected with brakes to be applied; and a manually operable valve adapted to interrupt the flow of oil to the parts of the engine to be lubricated and to divert the entire quantity of oil operated upon by said pump from its normal path to the parts to be lubricated, and cause it to flow into said cylinder.

2. In brake applying mechanism for motor driven vehicles and in combination with an engine for driving the vehicle, and a pump which is constantly driven by the engine and acts to force oil from the crank case thereof to various parts of the engine to be lubricated; a cylinder; a piston operating within said cylinder and which piston is operatively connected with brakes to be applied; a conduit leading from said pump to said cylinder; a passage leading from said cylinder to the crank case of the engine; and a manually operable valve adapted when in one position to place said conduit in communication with said cylinder and to interrupt flow through the passage aforesaid and to the parts of the engine to be lubricated, and when in another position to open said passage and to establish a communication between the conduit aforesaid and a second conduit leading to parts of the engine to be lubricated.

3. In brake applying mechanism for motor driven vehicles and in combination with an engine for driving the vehicle, and a pump which is constantly driven by the engine and acts to force oil from the crank case thereof to various parts of the engine to be lubricated; a cylinder; a piston operating within said cylinder and which piston is operatively connected with brakes to be applied; a valve adapted to interrupt the flow of oil to the parts of the engine to be lubricated and to divert the entire quantity of oil operated upon by said pump from its normal path to the parts to be lubricated, and cause it to flow into said cylinder; a brake pedal operatively connected with said valve to move the same; and a connection through which the brakes may be operated positively from said pedal.

4. A motor vehicle comprising, in combination, an oil-containing casing provided with an opening in its side, an oil pump in the casing, and a unit including a detachable cover for said opening, and a power cylinder and piston mounted on the cover, together with a valve-controlled connection from the oil pump to the cylinder.

In testimony whereof we affix our signatures.

MONTGOMERY W. McCONKEY.
FRED E. JONES.